United States Patent [19]

Fahlen et al.

[11] Patent Number: 4,733,944

[45] Date of Patent: Mar. 29, 1988

[54] OPTICAL BEAM INTEGRATION SYSTEM

[75] Inventors: Theodore S. Fahlen, San Jose; Sheldon B. Hutchison, Santa Clara; Timothy McNulty, San Jose, all of Calif.

[73] Assignee: XMR, Inc., Santa Clara, Calif.

[21] Appl. No.: 822,363

[22] Filed: Jan. 24, 1986

[51] Int. Cl.⁴ .............................................. G02B 27/00
[52] U.S. Cl. ................................................... 350/167
[58] Field of Search ............................... 350/167, 433

[56] References Cited

U.S. PATENT DOCUMENTS 2,531,399  11/1950  Cawein et al. ..................... 350/433

Primary Examiner—Bruce Y. Arnold
Attorney, Agent, or Firm—Townsend and Townsend

[57] ABSTRACT

An improved optical beam integration system for homogenizing a nonuniform radiant energy beam having a nonuniform beam intensity profile characteristic. The optical beam integration system comprises a first crossed lenticular cylindrical lens structure, a second crossed lenticular cylindrical lens structure, and a focusing lens interposed between a radiant energy source and an image or work plane. The nonuniform radiant energy beam from the radiant energy source refracts sequentially through the first and second crossed lenticular cylindrical lens structures and the focusing lens so as to produce a homogenized beam which forms an image in the work plane. The work plane is at a constant distance from the optical beam integration system. Preferably, the optical beam integration system is adjustable for selectively setting the size of the image produced by the homogenized beam in the work plane. The optical beam integration system is also preferably adjustable so that the aspect ratio of the image produced by the homogenized beam in the work plane can be selectively set. As a result, the effectiveness and flexibility of semiconductor processing by means of an ultraviolet excimer laser, for example, are substantially improved.

20 Claims, 10 Drawing Figures

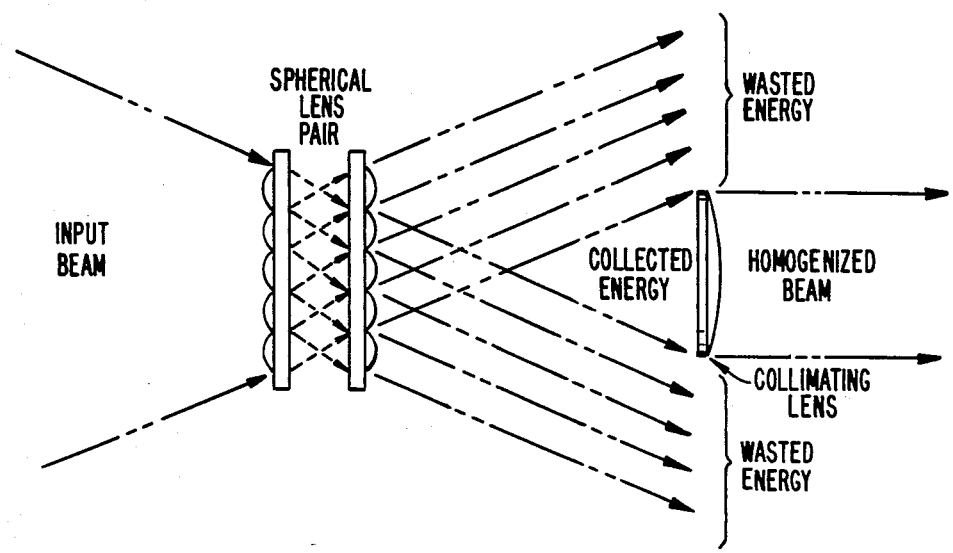
FIG._1. (PRIOR ART)
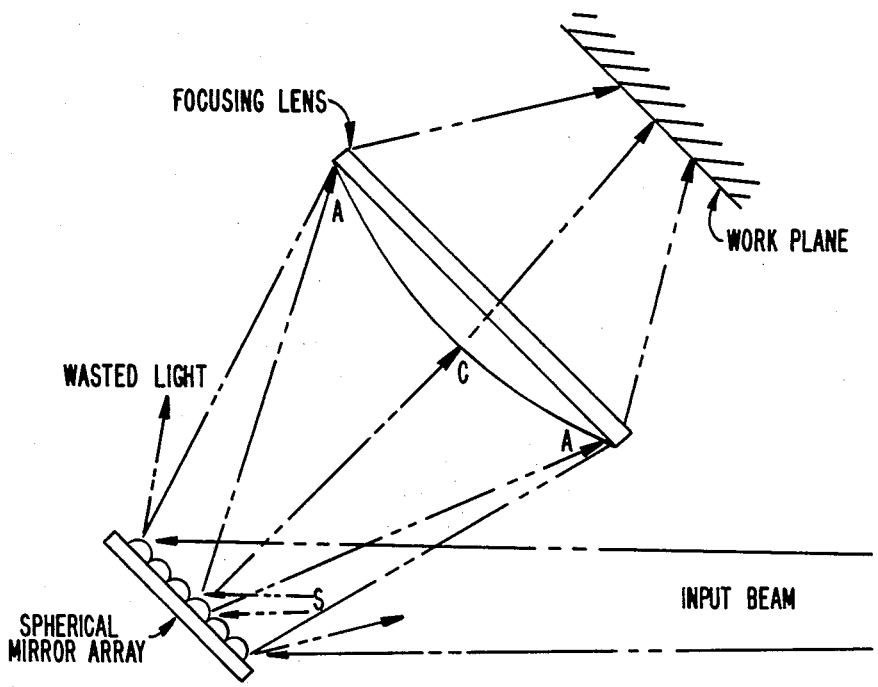
FIG._2. (PRIOR ART)

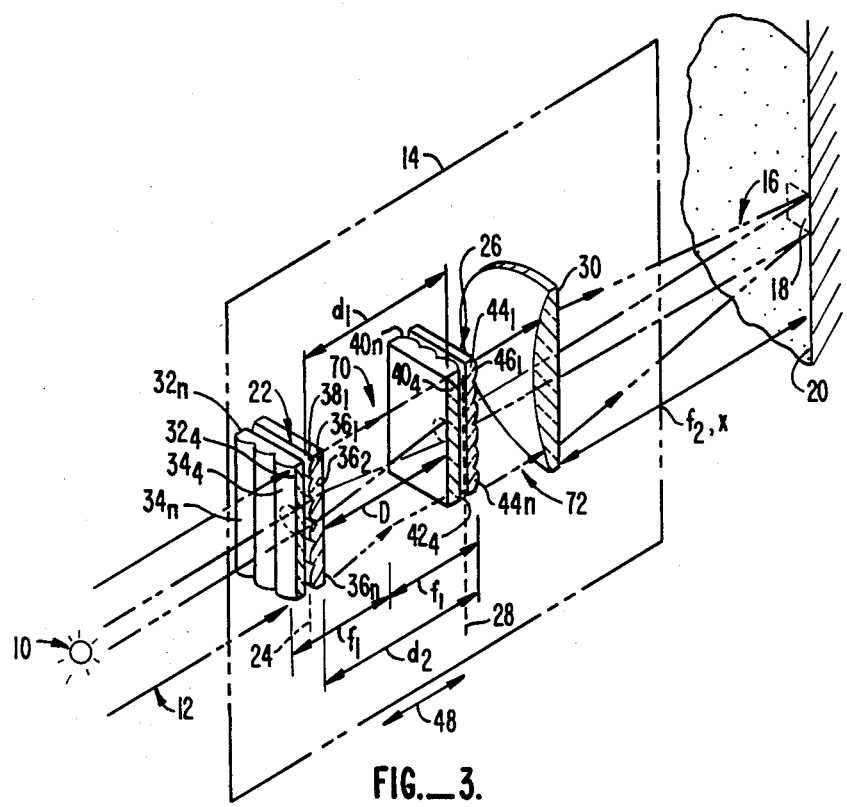
FIG._3.
FIG._4.

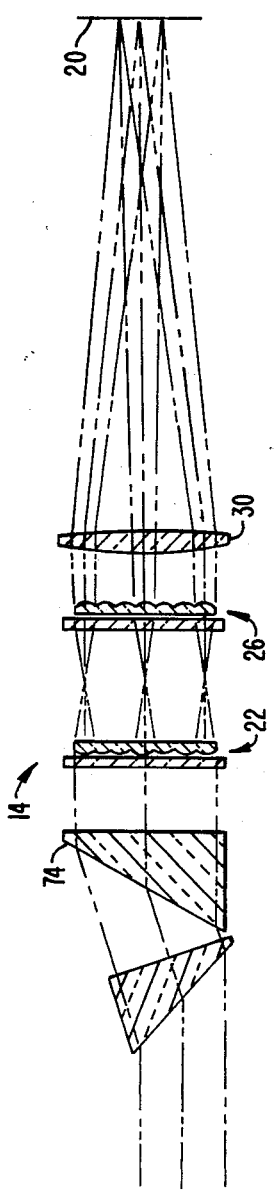
FIG._5.
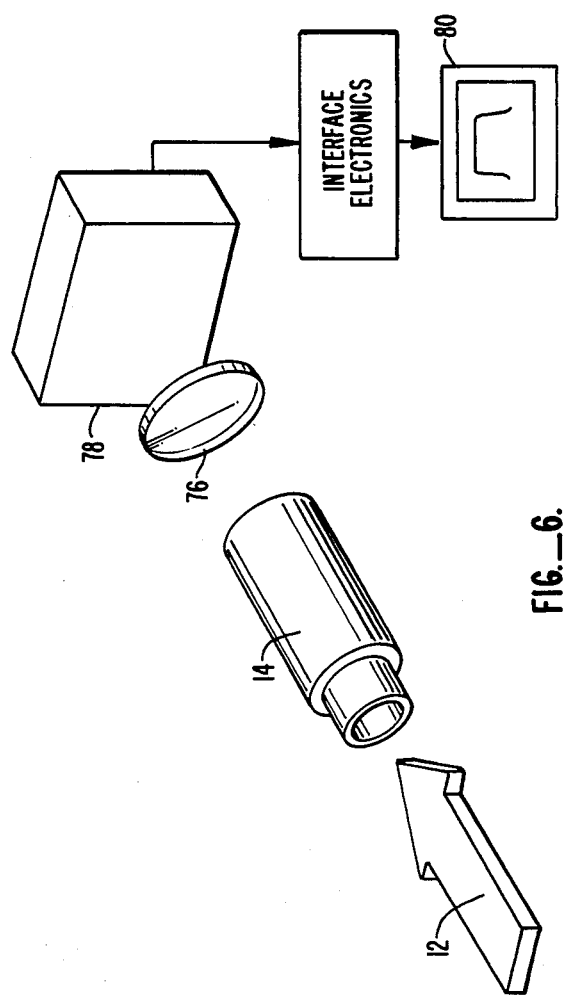
FIG._6.

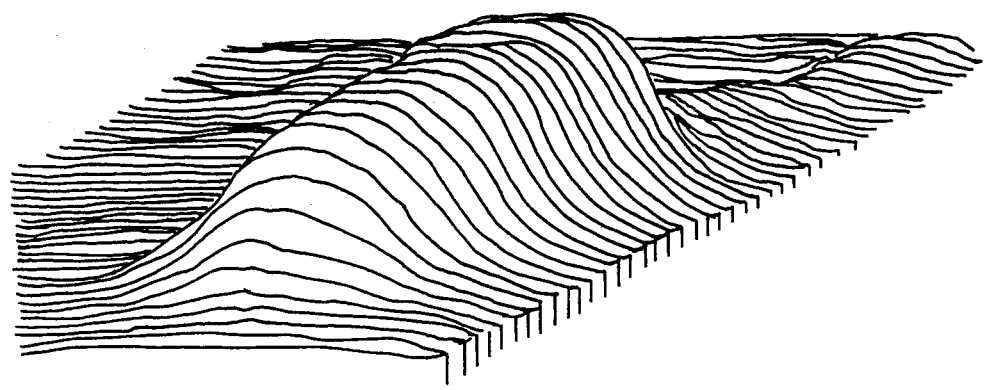
FIG._7.   1 CM.
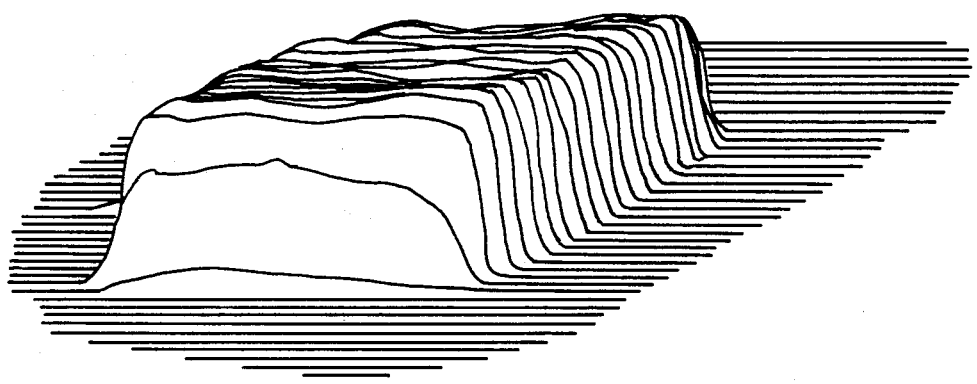
FIG._8.   1 CM.

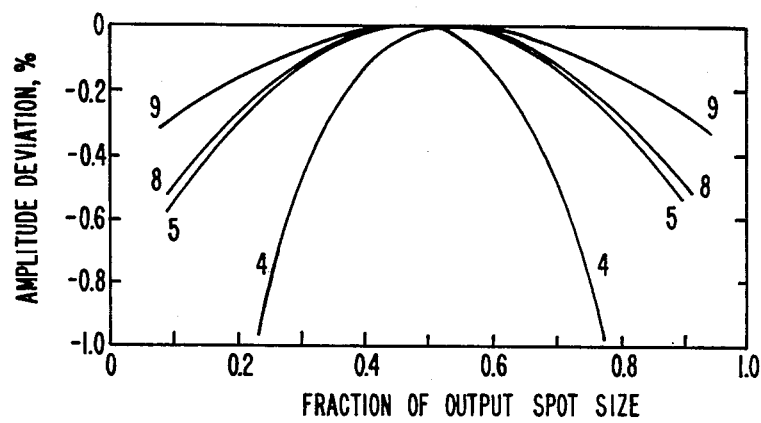
FIG._9.
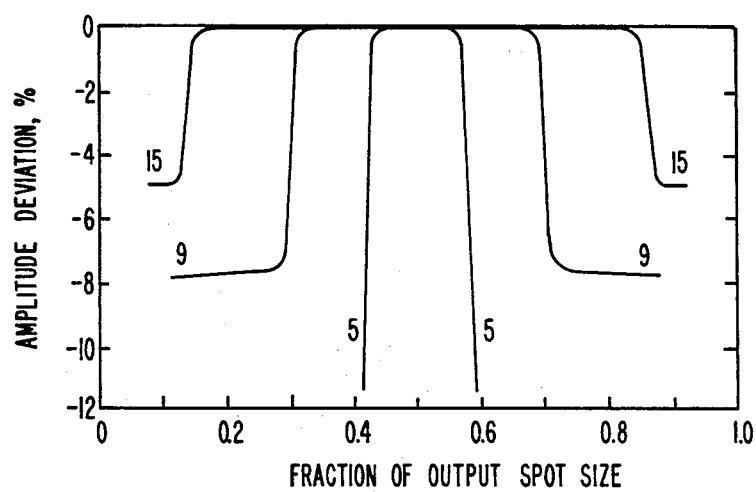
FIG._10.

OPTICAL BEAM INTEGRATION SYSTEM

BACKGROUND OF THE INVENTION

This invention relates to optical systems. More particularly, the invention is directed to radiant energy beam integration optics for improving beam intensity profile uniformity in the case of various lasers or other radiant energy sources having a nonuniform beam intensity profile characteristic.

For example, ultraviolet (UV) excimer lasers have recently been applied as semiconductor processing tools. Typical applications have included semiconductor annealing, microphotolithography, photodeposition, laser-induced chemical vapor deposition (CVD), gas immersion laser doping (GILDing), micromachining, and several other processes. In nearly all of these applications, laser output beam intensity profile uniformity is of paramount importance. Hereafter the term "beam uniformity" will be employed to refer to beam intensity profile uniformity. Present discharge UV excimer laser technology does not produce laser output beams of adequate uniformity while maintaining required laser output energy.

Currently, most of the work invested toward improving UV excimer laser output beam uniformity has concerned the laser configuration itself. Optical resonator design, electrode profiling techniques, and improvement of discharge preionization uniformity have increased the laser output beam uniformity significantly. By using available technology, it is possible to construct excimer lasers with relatively uniform output beam profiles. However, typical laser output beam uniformity of even +5 percent or so may be only marginally suitable for some illumination applications in which the laser output beam must be reduced to typical semiconductor die sizes in the range of 0.5 to 2.0 cm$^2$. In addition, few if any commercial UV excimer lasers maintain this level of uniformity over enough area of their output beams to ensure sufficient energy density. Further complicating this problem is the presence of occasional and essentially unpredictable changes in laser output beam uniformity on a shot-to-shot basis. Also, as semiconductor structures and device tolerances become smaller, the requirements for laser output beam uniformity become more severe. Therefore, the future development of semiconductor processing techniques using UV excimer lasers will require increasingly uniform laser output beams.

In contrast to optimizing the configuration of the laser itself, the present invention relates to improving beam uniformity based on optical techniques which act on the laser output beam. Specifically, the invention is directed to optical beam integration techniques.

Optical integrators have been incorporated into various types of illumination systems for many years. In most of these optical integrators, the homogenization of the input beam occurs in one of two ways. Optical integration techniques typically involve either some kind of randomization of the laser output beam (in phase or amplitude) or optical integration performed by the overlapping of numerous beam segments. The input beam can either be "scrambled" by a diffuser; a set of lenses with partially overlapping outputs (Oriel Corporation, 15 Market Street, Stamford, CT 06902, product model 6567-1, for example); random phase shift masks (Y. Kato and K. Mima, *Appl. Physics* B29, 186 (1982)) or echelons (R.H. Lehmberg and S.P. Obenschain, *Optics Comm.* 46, 27 (1983)); or by multiple scatterings in a tube much like a kaleidoscope (R.E. Grojean, D. Feldman, and J.F. Roach, *Rev. Sci. Inst.* 51, 375 (1980)). Alternatively, the input beam can be broken apart into segments and these segments then imaged on top of one another to average out fluctuations in beam intensity. FIGS. 1 and 2 illustrate typical optical integrator configurations for each of these classes.

On the one hand, FIG. 1 shows one example of a known optical integrator configuration in which the input beam is converging to a confocal spherical lens pair, each lens unit comprising several small spherical lenses mounted in a regular array. A portion of the outputs of these small lenses overlaps. This "scrambles" the now diverging beam in the near field. Since only a portion of the outputs of these small lenses overlaps, however, a substantial amount of the radiant energy that is input is wasted. An optical correcting lens (shown in FIG. 1) may be used to then obtain a somewhat collimated output. This configuration, however, produces images of the lens array in the far field, and thus the working distance is limited. In addition, if the scrambling is incomplete, input beam "hot spots" and other severe nonuniformities are not effectively removed. A focusing lens alone is not used and there is no adjustability of the size of the image. Finally, scrambling may not be useful in applications in which the coherence of the original laser output beam is an important factor for imaging. The incorporation of this configuration or any other refractive optical integrator into a laser is not known.

On the other hand, FIG. 2 shows a known configuration currently used for optical integration by overlapping many individual beam segments. For the sake of clarity, an input beam segment (S) diverges from one mirror in a cone of useful aperture (A) and central ray (C) to illuminate a focusing lens. In this configuration, a single array of spherical mirrors is illuminated by the input beam. The reflected light from each of these mirrors then expands, and if there is proper alignment, the reflected light will be collected by the focusing lens. While this configuration performs rudimentary optical integration, the incidence angle required for the mirror array limits the size of the input beam, and a significant fraction of the incident light may be lost beyond the diameter of the focusing lens. This also severely limits the output spot size available in typical configurations. In addition, off-axis beam displacements created by this configuration can provide undesirable complications in alignment and use. This configuration has been incorporated into point source laser-based holography systems in which input beam intensity profile uniformity is not as critical as in the case of semiconductor processing.

Unfortunately, the beam uniformity produced by known optical integrators would not be satisfactory for many applications, such as in the field of semiconductor processing. Furthermore, known optical integrators are configured so that the spot in the work plane has a fixed size and is also a fixed shape.

SUMMARY OF THE INVENTION

The present invention provides an improved optical beam integration system for homogenizing an input beam having a nonuniform beam intensity profile characteristic. The homogenized beam produced by the optical beam integration system in accordance with the invention has a constant image or work plane. Preferably, the optical beam integration system in accordance with the invention is adjustable for selectively setting the spot size produced by the homogenized beam in the work plane. The optical beam integration system in accordance with the invention is also preferably adjustable so that the aspect ratio of the spot produced by the homogenized beam in the work plane can be selectively set.

In accordance with one aspect of the invention, an optical beam integration system is provided which is responsive to an input beam of radiant energy having a nonuniform beam intensity profile characteristic, which is produced by a radiant energy source. The optical beam integration system comprises: a first crossed lenticular cylindrical lens means having a first predetermined focal length and aligned in a plane substantially orthogonal to the input beam; a second crossed lenticular cylindrical lens means having a second predetermined focal length and positioned at a distance from the first crossed lenticular cylindrical lens means and on an opposite side of the first crossed lenticular cylindrical lens means from the source, the second crossed lenticular cylindrical lens means being aligned in a plane substantially orthogonal to the input beam and in a plane parallel to the plane of the first crossed lenticular cylindrical lens means; and a focusing lens interposed between the second crossed lenticular cylindrical lens means and a work plane at a separation from the work plane; the input beam refracting sequentially through the first and second crossed lenticular cylindrical lens means and the focusing lens onto the work plane; whereby the input beam is homogenized so as to produce an image in the work plane having a relatively uniform intensity profile characteristic. Preferably, the first predetermined focal length and the second predetermined focal length equal a given focal length. Also, the distance between the first crossed lenticular cylindrical lens means and the second crossed lenticular cylindrical lens means is preferably in the range of zero to two times the given focal length. Furthermore, at least one of the first crossed lenticular cylindrical lens means and the second crossed lenticular cylindrical lens means can be movably mounted so that the distance between the first and second crossed lenticular cylindrical lens means is selectively settable, and means can be connected to the movable crossed lenticular cylindrical lens means for enabling the distance between the first crossed lenticular cylindrical lens means and the second crossed lenticular cylindrical lens means to be adjusted, whereby the size of the image in the work plane is adjustable.

Preferably, the first crossed lenticular cylindrical lens means comprises at least a first cylindrical lens having the given focal length and having a longitudinal axis aligned in a plane substantially orthogonal to the input beam and a convex face oriented toward the source, and at least a second cylindrical lens having the given focal length and positioned proximate to the first cylindrical lens and on an opposite side of the first cylindrical lens from the source, the second cylindrical lens having a longitudinal axis aligned in a plane substantially orthogonal to the input beam and a convex face oriented toward the source, the longitudinal axis of the second cylindrical lens being oriented substantially perpendicular to the longitudinal axis of the first cylindrical lens. Furthermore, the second crossed lenticular cylindrical lens means preferably comprises at least a third cylindrical lens having the given focal length and positioned at a first spacing from the first cylindrical lens and on the side of the second cylindrical lens opposite the source, the third cylindrical lens having a longitudinal axis aligned in a plane substantially orthogonal to the input beam and a convex face oriented away from the source, the longitudinal axis of the third cylindrical lens being parallel to the longitudinal axis of the first cylindrical lens, and at least a fourth cylindrical lens having the given focal length and positioned proximate to the third cylindrical lens and on the side of the third cylindrical lens opposite from the source, the fourth cylindrical lens being positioned at a second spacing from the second cylindrical lens, the fourth cylindrical lens having a longitudinal axis aligned in a plane substantially orthogonal to the input beam and a convex face oriented away from the source, the longitudinal axis of the fourth cylindrical lens being oriented substantially perpendicular to the longitudinal axis of the third cylindrical lens, the longitudinal axis of the fourth cylindrical lens being parallel to the longitudinal axis of the second cylindrical lens. The input beam refracts sequentially through the first, second, third, and fourth cylindrical lenses and the focusing lens onto the work plane. At least one of the first and third cylindrical lenses, as well as at least one of the second and fourth cylindrical lenses, are preferably movably mounted so that the first spacing, as well as the second spacing, are selectively settable, and means can be connected to each movable cylindrical lens for enabling the first spacing, as well as the second spacing, to be adjusted, whereby the aspect ratio of the image in the work plane is adjustable.

In accordance with another aspect of the invention, a method is provided for optically integrating an input beam of radiant energy having a nonuniform beam intensity profile characteristic, which is produced by a radiant energy source. The optical integration method comprises the steps of: refracting the input beam through a first crossed lenticular cylindrical lens means having a first predetermined focal length and aligned in a plane substantially orthogonal to the input beam, thereby producing a first intermediate beam; refracting the first intermediate beam through a second crossed lenticular cylindrical lens means having a second predetermined focal length and positioned at a distance from the first crossed lenticular cylindrical lens means and on an opposite side of the first crossed lenticular cylindrical lens means from the source, the second crossed lenticular cylindrical lens means being aligned in a plane substantially orthogonal to the input beam and in a plane parallel to the plane of the first crossed lenticular cylindrical lens means, thereby producing a second intermediate beam; and refracting the second intermediate beam through a focusing lens having a preselected focal length and interposed between the second crossed lenticular cylindrical lens means and a work plane at a separation from the work plane, thereby producing a homogenized beam so as to produce an image in the work plane having a relatively uniform intensity profile characteristic. Preferably, the first predetermined focal length and the second predetermined focal length equal a given focal length. Also, the distance between the first crossed lenticular cylindrical lens means and the second crossed lenticular cylindrical lens means is preferably in the range of zero to two times the given focal length. Furthermore, the method preferably further comprises the step of adjusting the distance between the first crossed lenticular cylindrical lens means and the second crossed cylindrical lens means, thereby adjusting the size of the image in the work plane. Preferably, the method further comprises the step of adjusting a first spacing between a first cylindrical lens included in the first crossed cylindrical lens means and a third cylindrical lens included in the second crossed lenticular cylindrical lens means, as well as the step of adjusting a second spacing between a second cylindrical lens included in the first crossed cylindrical lens means and a fourth cylindrical lens included in the second crossed lenticular cylindrical lens means, thereby adjusting the aspect ratio of the image in the work plane.

The optical beam integration system in accordance with the invention provides substantial improvement in the uniformity of the intensity profile characteristic of a nonuniform input beam. The optical beam integration system is responsive to a quasi-Gaussian radiant energy beam input for producing a homogenized beam having a "top hat" intensity profile characteristic at a constant location in space. Furthermore, the size of the image in the work plane and the aspect ratio of the image in the work plane are also preferably adjustable. As a result, the effectiveness and flexibility of semiconductor processing by means of an ultraviolet (UV) excimer laser, for example, are substantially improved. The availability of intense, highly uniform UV illumination excimer laser sources will allow development of semiconductor processing techniques requiring closer tolerances than currently available from laser devices operating in the wavelength regions of interest.

p BRIEF DESCRIPTION OF THE DRAWINGS

The above and other features of the invention and the concomitant advantages will be better understood and appreciated by those skilled in the art in view of the description of the preferred embodiments given below in conjunction with the accompanying drawings. In the drawings:

FIG. 1 illustrates an example of a known optical integrator configuration using scrambled diverging beam segments;

FIG. 2 illustrates an example of a known optical integrator configuration using off-axis reflective beam overlap of many individual beam segments;

FIG. 3 is a schematic diagram of one embodiment of an optical beam integration system in accordance with the invention;

FIG. 4 is a side elevational view of an embodiment of the optical beam integration system shown in FIG. 3, which further comprises means for adjusting the size and/or aspect ratio of the image in the image or work plane;

FIG. 5 is a schematic diagram of an embodiment of an optical beam integration system in accordance with the invention for use in conjunction with an input beam from an ultraviolet excimer laser;

FIG. 6 shows instrumentation for measuring the intensity profile characteristic of the homogenized beam produced by the optical beam integration system in accordance with the invention;

FIG. 7 is a plot of the measured intensity profile characteristic of an output beam from a high-power ultraviolet excimer laser;

FIG. 8 is a plot of the measured intensity profile characteristic of the laser output beam shown in FIG. 7 after passing through the optical beam integration system in accordance with the invention;

FIG. 9 is a plot of the intensity uniformity of a multilens optical beam integration system in accordance with the invention in response to a Gaussian input beam for optical beam integration systems having different numbers of cylindrical lenses; and FIG. 10 is a plot of the intensity uniformity of a multilens optical beam integration system in accordance with the invention in response to a Gaussian input beam, having a superimposed asymmetric nonuniformity located at a position corresponding to 0.7 times the image size and equal to the peak input intensity, for optical beam integration systems having different numbers of cylindrical lenses.

DESCRIPTION OF THE PREFERRED EMBODIMENTS

This invention relates to improving the uniformity of the intensity profile characteristic of a beam of radiant energy. Referring to FIG. 3, a radiant energy source 10 produces a radiant energy beam 12. The radiant energy beam 12 has a nonuniform beam intensity profile characteristic, for example, in the case of the output beam of an ultraviolet (UV) excimer laser. The nonuniformity of such a radiant energy beam 12 is undesirable.

The invention provides an optical beam integration system, generally indicated by the numeral 14 in FIG. 3, which is responsive to an input in the form of the radiant energy beam 12 from the radiant energy source 10 for producing a homogenized beam 16 having a relatively uniform intensity profile characteristic.

The homogenized beam 16 produces an image 18 on an image or work plane 20 having uniform intensity across the image. Advantageously, the work plane 20 is located at a constant position with respect to the optical beam integration system 14. Preferably, however, the size of the image 18 in the work plane 20 is adjustable and/or the aspect ratio of the image in the work plane is adjustable.

Considered in more detail, the optical beam integration system 14 comprises a first crossed cylindrical lens means 22 having a first predetermined focal length equal to a given focal length $f_1$. The first crossed lenticular cylindrical lens means 22 is aligned in a plane 24 substantially orthogonal to the radiant energy beam 12.

The optical beam integration system 14 further comprises a second crossed lenticular cylindrical lens means 26 having a second predetermined focal length also preferably equal to the given focal length $f_1$. The second crossed lenticular cylindrical lens means 26 is positioned at a distance D from the first crossed lenticular cylindrical lens means 22 and on an opposite side of the first crossed lenticular cylindrical lens means from the radiant energy source 10, as shown in FIG. 3. The second crossed lenticular cylindrical lens means 26 is aligned in a plane 28 substantially orthogonal to the radiant energy beam 12 and parallel to the plane 24 of the first crossed lenticular cylindrical lens means 22.

The first crossed lenticular cylindrical lens means 22 and the second crossed lenticular cylindrical lens means 26 preferably have the same predetermined focal length, that is, the given focal length $f_1$, as described earlier. Preferably, the distance D between the first crossed lenticular cylindrical lens means 22 and the second crossed lenticular cylindrical lens means 26 is in the range of zero to two times the given focal length $f_1$. Consequently, substantially all of the radiant energy contained in the radiant energy beam 12 will pass through the first crossed lenticular cylindrical lens means 22 and the second crossed lenticular cylindrical lens means 26. If the second crossed lenticular cylindrical lens means 26 is located farther away than twice the given focal length $f_1$ from the first crossed cylindrical lens means 22, radiant energy will be lost.

Finally, the optical beam integration system 14 further comprises a focusing lens 30 having a preselected focal length $f_2$. The focusing lens 30 is interposed between the second crossed lenticular cylindrical lens means 26 and the work plane 20 at a separation X from the work plane. The separation X between the focusing lens 30 and the work plane 20 is preferably equal to the preselected focal length $f_2$ of the focusing lens.

Considered in more detail, the first crossed lenticular cylindrical lens means 22 comprises at least a first cylindrical lens $32_1$. Preferably, the first crossed lenticular cylindrical lens means 22 includes multiple first cylindrical lenses $32_1, 32_2, \ldots, 32_n$. Each of the first cylindrical lenses $32_1, 32_2, \ldots, 32_n$ has a longitudinal axis aligned in a plane parallel to the plane 24 which is substantially orthogonal to the radiant energy beam 12. The first cylindrical lenses $32_1, 32_2, \ldots, 32_n$ have convex faces $34_1, 34_2, \ldots, 34_n$, respectively, oriented toward the radiant energy source 10.

The first crossed lenticular cylindrical lens means 22 also comprises at least a second cylindrical lens $36_1$ positioned proximate to the first cylindrical lens $32_1$ and on an opposite side of the first cylindrical lens from the radiant energy source 10. Preferably, the first crossed lenticular cylindrical lens means 22 includes multiple second cylindrical lenses $36_1, 36_2, \ldots, 36_n$ positioned proximate to the first cylindrical lenses $32_1, 32_2, \ldots, 32_n$ and on an opposite side of the first cylindrical lenses from the radiant energy source 10. Each of the second cylindrical lenses $36_1, 36_2, \ldots, 36_n$ has a longitudinal axis aligned in a plane parallel to the plane 24 which is substantially orthogonal to the radiant energy beam 12. Additionally, the longitudinal axes of the second cylindrical lenses $36_1, 36_2, \ldots, 36_n$ are oriented substantially perpendicular to the longitudinal axes of the first cylindrical lenses $32_1, 32_2, \ldots, 32_n$. The second cylindrical lenses $36_1, 36_2, \ldots, 36_n$ have convex faces $38_1, 38_2, \ldots, 38_n$, respectively, oriented toward the radiant energy source 10. Consequently, the orientation of the convex faces $38_1, 38_2, \ldots, 38_n$ of the respective second cylindrical lenses $36_1, 36_2, \ldots, 36_n$ are oriented toward the radiant energy source 10 as in the case of the convex faces $34_1, 34_2, \ldots, 34_n$ of the respective first cylindrical lenses $32_1, 32_2, \ldots, 32_n$.

Continuing to refer to FIG. 3, the second crossed lenticular cylindrical lens means 26 comprises at least a third cylindrical lens $40_1$ positioned at a first spacing $d_1$ from the first cylindrical lens $32_1$ and on an opposite side of the second cylindrical lens $36_1$ from the radiant energy source 10. Preferably, the second crossed lenticular cylindrical lens means 26 includes multiple third cylindrical lenses $40_1, 40_2, \ldots, 40_n$. Each of the third cylindrical lenses $40_1, 40_2, \ldots, 40_n$ has a longitudinal axis aligned in a plane parallel to the plane 28 which is substantially orthogonal to the radiant energy beam 12. Additionally, the longitudinal axes of the third cylindrical lenses $40_1, 40_2, \ldots, 40_n$ are oriented substantially parallel to the respective longitudinal axes of the first cylindrical lenses $32_1, 32_2, \ldots, 32_n$. The third cylindrical lenses $40_1, 40_2, \ldots, 40_n$ have convex faces $42_1, 42_2, \ldots, 42_n$, respectively, oriented away from the radiant energy source 10, as shown in FIG. 3.

The second crossed lenticular cylindrical lens means 26 also comprises at least a fourth cylindrical lens $44_1$ positioned proximate to the third cylindrical lens $40_1$.

The fourth cylindrical lens $44_1$ is positioned at a second spacing $d_2$ from the second cylindrical lens $36_1$. Preferably, the second crossed lenticular cylindrical lens means 26 includes multiple fourth cylindrical lenses $44_1, 44_2, \ldots, 44_n$ positioned proximate to the third cylindrical lenses $40_1, 40_2, \ldots, 40_n$. Each of the fourth cylindrical lenses $44_1, 44_2, \ldots, 44_n$ has a longitudinal axis aligned in a plane parallel to the plane 28 which is substantially orthogonal to the radiant energy beam 12. Additionally, the longitudinal axes of the fourth cylindrical lenses $44_1, 44_2, \ldots, 44_n$ are oriented substantially perpendicular to the respective longitudinal axes of the third cylindrical lenses $40_1, 40_2, \ldots, 40_n$ and parallel to the respective longitudinal axes of the second cylindrical lenses $36_1, 36_2, \ldots, 36_n$. The fourth cylindrical lenses $44_1, 44_2, \ldots, 44_n$ have convex faces $46_1, 46_2, \ldots, 46_n$, respectively, which are oriented away from the radiant energy source 10. Consequently, the convex faces $46_1, 46_2, \ldots, 46_n$ of the respective fourth cylindrical lenses $44_1, 44_2, \ldots, 44_n$ are oriented away from the radiant energy source 10 as in the case of the convex faces $42_1, 42_2, \ldots, 42_n$ of the respective third cylindrical lenses $40_1, 40_2, \ldots, 40_n$.

Each of the first cylindrical lenses $32_1, 32_2, \ldots, 32_n$ and the second cylindrical lenses $36_1, 36_2, \ldots, 36_n$ preferably has the given focal length $f_1$. Preferably, each of the third cylindrical lenses $40_1, 40_2, \ldots, 40_n$ and the fourth cylindrical lenses $44_1, 44_2, \ldots, 44_n$ also has the given focal length $f_1$.

Preferably, the distance D between the first crossed lenticular cylindrical lens means 22, comprised of the first cylindrical lenses $32_1, 32_2, \ldots, 32_n$ and the second cylindrical lenses $36_1, 36_2, \ldots, 36_n$, and the second crossed lenticular cylindrical lens means 26, comprised of the third cylindrical lenses $40_1, 40_2, \ldots, 40_n$ and the fourth cylindrical lenses $44_1, 44_2, \ldots, 44_n$, is adjustable in the directions indicated by double-headed arrow 48. The range of adjustment is preferably in the range from zero to two times the given focal length $f_1$. Adjustment of the distance D provides adjustability of the size of the image 18 in the work plane 20.

The first spacing $d_1$ between the first cylindrical lenses $32_1, 32_2, \ldots, 32_n$ and the third cylindrical lenses $40_1, 40_2, \ldots, 40_n$, as well as the second spacing $d_2$ between the second cylindrical lenses $36_1, 36_2, \ldots, 36_n$ and the fourth cylindrical lenses $44_1, 44_2, \ldots, 44_n$, are also preferably separately adjustable in the directions indicated by the double-headed arrow 48. Adjustment of the first spacing $d_1$ and the second spacing $d_2$ individually provides adjustability of the aspect ratio of the image 18 in the work plane 20.

The aspect ratio is adjusted by separately adjusting the first spacing $d_1$ between the first cylindrical lenses $32_1, 32_2, \ldots, 32_n$ and the third cylindrical lenses $40_1, 40_2, \ldots, 40_n$, as well as the second spacing $d_2$ between the second cylindrical lenses $36_1, 36_2, \ldots, 36_n$ and the fourth cylindrical lenses $44_1, 44_2, \ldots, 44_n$. Adjustment of the first spacing $d_1$ determines the horizontal size of the image 18 produced by the homogenized beam 16 in the work plane 20, and adjustment of the second spacing $d_2$ determines the vertical size of the image produced by the homogenized beam in the work plane. Adjustment of the first spacing $d_1$ and the second spacing $d_2$ simultaneously can adjust the overall size of the image 18 produced by the homogenized beam 16 in the work plane 20 while maintaining the same aspect ratio.

An embodiment of the optical beam integration system 14 which further comprises means for adjusting the size of the image 18 in the work plane 20 is shown in FIG. 4. The embodiment of the optical beam integration system 14 shown in FIG. 4 also comprises means for adjusting the aspect ratio of the image 18 in the work plane 20.

Referring to FIG. 4, at least one of the first crossed lenticular cylindrical lens means 22 and the second crossed cylindrical lens means 26 is movably mounted in a housing 50 so that the distance D between the first and second crossed cylindrical lens means is selectively settable. As shown in FIG. 4, the first crossed lenticular cylindrical lens means 22 comprises the first cylindrical lenses $32_1, 32_2, \ldots, 32_n$ and the second cylindrical lenses $36_1, 36_2, \ldots, 36_n$ mounted in a lens bracket 52. The lens bracket 52 is in turn secured to a movable platform 54 mounted by means of a ball bearing slide 56 for movement so as to adjust the distance D between the first crossed lenticular cylindrical means 22 and the second crossed lenticular cylindrical lens means 26. This adjusts the size of the image 18 produced by the homogenized beam 16 in the work plane 20 without changing the aspect ratio.

Furthermore, the lens bracket 52 preferably comprises a first lens holder 58 and a second lens holder 60. The first cylindrical lenses $32_1, 32_2, \ldots, 32_n$ are preferably mounted in the first lens holder 58, and the second cylindrical lenses $36_1, 36_2, \ldots, 36_n$ are preferably mounted in the second lens holder 60. The first lens holder 58 is in turn secured to the movable platform 54 mounted by means of the ball bearing slide 56 for movement so as to adjust the first spacing $d_1$ between the first cylindrical lenses $32_1, 32_2, \ldots, 32_n$ and the third cylindrical lenses $40_1, 40_2, \ldots, 40_n$. Also, the second lens holder 60 is in turn secured to a movable platform 62 mounted by means of a ball bearing slide 64 for movement so as to adjust the second spacing $d_2$ between the second cylindrical lenses $36_1, 36_2, \ldots, 36_n$ and the fourth cylindrical lenses $44_1, 44_2, \ldots, 44_n$. The second cylindrical lenses $36_1, 36_2, \ldots, 36_n$ together with the means for adjusting the second spacing $d_2$ between the second cylindrical lenses and the fourth cylindrical lenses $44_1, 44_2, \ldots 44_n$, namely, the lens holder 60, platform 62, and ball bearing slide 64, are movably mounted to the platform 54.

On the one hand, the optical beam integration system 14 shown in FIG. 4 is configured to secure the cylindrical lenses in stable arrays and to provide a convenient but high accuracy adjustment mechanism for setting the spacings between lens arrays and therefore the size and/or shape of the image 18. If, on the other hand, the integrated image size and shape is fixed, a separate optical beam integration system 14 is needed for each processing application.

As shown in FIG. 4, the second crossed lenticular cylindrical lens means 26 comprises the third cylindrical lenses $40_1, 40_2, \ldots, 40_n$ and the fourth cylindrical lenses $44_1, 44_2, \ldots, 44_n$ mounted in another lens bracket 66. The lens bracket 66 is preferably fixedly mounted. Furthermore, the focusing lens 30 is mounted in an additional lens bracket 68. The lens bracket 68 is also preferably fixedly mounted.

In operation, referring to FIG. 3, the radiant energy source 10 emits the radiant energy beam 12. The radiant energy beam 12 impinges on the first crossed lenticular cylindrical lens means 22 and is refracted through the first crossed lenticular cylindrical lens means toward the second crossed lenticular cylindrical lens means 26. This produces a first intermediate beam 70 in the region between the first crossed lenticular cylindrical lens means 22 and the second crossed lenticular cylindrical lens means 26.

The distance D between the first crossed lenticular cylindrical lens means 22 and the second crossed lenticular cylindrical lens means 26 is in the range from zero to two times the given focal length $f_1$ of the first crossed lenticular cylindrical lens means. Dependent upon the distance D between the first crossed lenticular cylindrical lens means 22 and the second crossed lenticular cylindrical lens means 26, the first intermediate beam 70 impinges on the second crossed lenticular cylindrical lens means at a distance up to and including the distance $2f_1$. Thereafter, the first intermediate beam 70 is refracted through the second crossed lenticular cylindrical lens means 26, which produces a second intermediate beam 72.

The second intermediate beam 72 then impinges on the focusing lens 30. The second intermediate beam 72 is refracted through the focusing lens 30 to produce the homogenized beam 16 which is focused at the focal length $f_2$ of the focusing lens onto the work plane 20 so as to form the image 18.

Also, referring to FIGS. 3 and 4, the first cylindrical lenses $32_1, 32_2, \ldots, 32_n$ mounted in the first lens holder 58 secured to the platform 54 can be slid on the ball bearing slide 56 for adjusting the first spacing $d_1$ between the first cylindrical lenses and the third cylindrical lenses $40_1, 40_2, \ldots, 40_n$. Furthermore, the second cylindrical lenses $36_1, 36_2, \ldots, 36_n$ mounted in the second lens holder 60 secured to the platform 62 can be slid on the ball bearing slide 64 for adjusting the second spacing $d_2$ between the second cylindrical lenses and the fourth cylindrical lenses $44_1, 44_2, \ldots, 44_n$. This permits the aspect ratio of the image 18 produced by the homogenized beam 16 in the work plane 20 to be selectively set. The aspect ratio is adjusted by separately adjusting the first spacing $d_1$ of the first cylindrical lenses $32_1, 32_2, \ldots, 32_n$ from the third cylindrical lenses $40_1, 40_2, \ldots, 40_n$ and the second spacing $d_2$ of the second cylindrical lenses $36_1, 36_2, \ldots, 36_n$ from the fourth cylindrical lenses $44_1, 44_2, \ldots, 44_n$. Adjustment of the first spacing $d_1$ determines the horizontal size of the image 18, and adjustment of the second spacing $d_2$ determines the vertical size. Adjustment of the first spacing $d_1$ and the second spacing $d_2$ together adjusts the image size while maintaining the same aspect ratio.

One implementation of the optical beam integration system 14 preferably has the following features. The input beam aspect ratio can be up to 1.5:1. Approximately a two-inch (1.65-inch or 42-mm) square clear input aperture is preferably provided. Preferably, the homogenized beam image size is variable over a minimal range from 9 to 400 mm² with a typical working distance of approximately six inches (5.5 inches or 140 mm). The homogenized beam 16 is also preferably coaxial with the radiant energy beam 12 input during typical operation. The homogenized beam uniformity is better than ±2 percent for theoretical Gaussian input (1/e point at aperture edge). The overall length is preferably as compact as possible. The homogenized beam uniformity is better than ±10 percent with the input perturbed by nonsymmtric nonuniformity (such as caused by laser discharge "hot spots") having a width of no more than 10 percent of the laser output aperture and intensity of no more than the normal peak laser beam output intensity. All converging focal points at the work plane 20 are preferably within a distance of approximately 10 percent of the image size. Both spatial dimensions of the homogenized beam 16 having a "top hat" intensity profile characteristic are individually adjustable from 3 mm to 20 mm without changing the spatial location of the homogenized beam image 18 in the work plane 20. The beam uniformity of the homogenized beam 16 for a quasi-Gaussian radiant energy beam input is better than ±5 percent at a 3 mm spot size and better still at larger spot sizes.

The housing 50 can have dimensions of $5.375 \times 5.75 \times 6.125$ inches with the optical axis being along the 6.125-inch dimension. The first crossed cylindrical lens means 22 and the second crossed lenticular cylindrical lens means 26 can comprise orthogonal arrays of 10 cylindrical lenses, each array having dimensions of $2.5 \times 2.5 \times 0.25$ inches. Quartz lenses are preferably used. The transmission of quartz lenses is greater than 95 percent for radiant energy having a wavelength of 308 nm.

FIG. 5 schematically illustrates an embodiment of the optical beam integration system 14 for use with an ultraviolet (UV) excimer laser as the radiant energy source 10. The optical beam integration system 14 further comprises prism beam expanders 74 interposed between the radiant energy source 10 and the first crossed lenticular cylindrical lens means 22.

Tests employed a typical experimental setup, as shown in FIG. 6. A UV excimer laser was used in these tests as the radiant energy source 10 for producing the radiant energy beam 12. The laser chosen provided a given output beam size and uniformity. The optical beam integration system 14 was interposed between the radiant energy soruce 10 and an optical attenuator 76. The radiant energy beam 12 was passed through the optical beam integration system 14 and the attenuator 76 to a vidicon 78 used to monitor the UV light. The data were reproduced photographically and digitized for quantitative computer analysis and plotting by means of a display 80. The principle areas of interest for these tests focused on how the beam uniformity changes in the homogenized beam 16 for a number of parameters, such as the number of lenses illuminated (changed by masking the first crossed lenticular cylindrical lense means 22); the image size; the uniformity (or nonuniformity) of the radiant energy beam 12; and misalignment between optical elements (possible during adjustments), for example.

The optical beam integration system 14 was tested in actual use in the beam of xenon chloride (XeCl) UV excimer laser of high power up to 150 watts average. The quality of beam homogenization was determined by vidicon diagnostics, as shown in FIG. 6. FIG. 7 shows a plot of measured values of the laser beam intensity one meter in front of a Model XC-150 XeCl UV excimer laser available from the assignee of this application. FIG. 8 shows a plot of measured values of the laser beam intensity of FIG. 7 after being passed through the optical beam integration system 14.

Quantitative measurements have been made using the optical beam integration system 14 to determine effectiveness. These measurements address primarily the issues of beam uniformtiy as a function of input, alignment, focusing optics, image size and working distance, number of segments illuminated, and possible distortion effects.

FIGS. 9 and 10 illustrate typical computer generated data for one-dimensional cylindrical lens configurations for the optical beam integration system 14. The data presented in FIG. 9 demonstrate integrated output intensity uniformity of a multilens optical beam integration system 14 for a Gaussian input as a function of total cylindrical lenses illuminated in each array, that is, as a function of the number n of cylindrical lenses in the array of first cylindrical lenses $32_1, 32_2, \ldots, 32_n$, the array of second cylindrical lenses $36_1, 36_2, \ldots, 36_n$, the array of third cylindrical lenses $40_1, 40_2, \ldots, 40_n$, and the array of fourth cylindrical lenses $44_1, 44_2, \ldots, 44_n$. The numbers beside each curve indicate the number of cylindrical lenses in each array. The data indicate integration increases with the number of cylindrical lenses, and that the effect is enhanced if one cylindrical lens is positioned at the peak (center) of the input beam.

FIG. 10 illustrates similar data for a gross asymmetric nonuniformity. The data presented in FIG. 10 demonstrate integrated output intensity uniformity of a multilens optical beam integration system 14 for a Gaussian input as a function of total cylindrical lenses illuminated in each array with a superimposed asymmetric nonuniformity or "hot spot." In this case, the "hot spot" is equal to the Gaussian peak input intensity and is located at $R=0.7$ (the position corresponding to 0.7 times the image size) with a width of ±0.05 units of R. The numbers beside each curve indicate the number of cylindrical lenses in each array. Even such enormous nonuniformities can be smoothed by increasing the number of illuminated cylindrical lenses. Such data suggest that an optimum configuration for the optical beam integration system 14 includes a large number of moderate-sized cylindrical lenses with up-collimation at the input. The reason for this is the increasing difficulties encountered in fabricating cylindrical lenses with diminishing width-to-length aspect ratios.

The optical beam integration system 14, when used in conjunction with the proper laser illumination source, can advance further development of UV laser semiconductor processing techniques. The laser illumination sources range from a laser micromachining center which uses a small 10 mJ output UV excimer laser to a large, industrial UV excimer laser operating at 500 Hz and with average output powers of over 150 watts. The applications under investigation have required increasingly uniform laser illumination. In particular, the optical beam integration system 14 allows the UV excimer laser output to be both uniform and adaptable to a given process due to the adjustability of the image size and aspect ratio in the chosen configuration.

The optical beam integration system 14 is configured to provide optimum integration. However, the optical beam integration system 14 can be fabricated with a minimal expenditure for material. The optical beam integration system 14 allows for continuously variable image size and/or aspect ratio for a fixed input beam. The optical beam integration system 14 allows available UV excimer lasers to provide sufficiently uniform illumination for advanced semiconductor processing techniques, as well as other applications.

Although the optical beam integration system 14 preferably provides an optical and mechanical configuration which is implemented using quartz optics, moldable plastic materials can provide a lower cost substitute for the quartz optics. Special plastics with low absorption in the UV wavelength region can be identified, obtained, and irradiated with a high average power UV excimer laser beam to determine their optical, mechanical, and thermal suitability as a UV lens material. The optical beam integration system 14 can be implemented using suitable plastic material. This can lead to optical improvements and/or manufacturing cost savings.

The optical beam integration system 14 can be fabricated using replicated optical elements. The importance of this lies in the ultimate requirement of the production of large numbers of high-quality cylindrical lens arrays. The performance of such cylindrical lens arrays is largely a function of design tolerance requirements and fabrication capabilities. It is important to maintain mechanical stability while allowing adjustability to change image size and/or shape.

The foregoing description is offered primarily for purposes of illustration. One modification is that suitable materials other than quartz lenses and other fabrication techniques for large-scale replicated optical arrays can be used. Although the embodiments of the optical beam integration system 14 provide a working configuration using available lens technology, other embodiments are contemplated. While a variety of embodiments has been disclosed, it will be readily apparent to those skilled in the art that numerous other modifications and variations not mentioned above can still be made without departing from the spirit and scope of the invention as claimed below.

What is claimed is:

1. An optical beam integration system responsive to an input beam of radiant energy from a radiant energy source, the input beam having a nonuniform beam intensity profile characteristic, comprising:
   a first crossed lenticular cylindrical lens means having a first predetermined focal length and aligned in a plane substantially orthogonal to the input beam;
   a second crossed lenticular cylindrical lens means having a second predetermined focal length and positioned at a distance from the first crossed lenticular cylindrical lens means and on an opposite side of the first crossed lenticular cylindrical lens means from the source, the second crossed lenticular cylindrical lens means being aligned in a plane substantially orthogonal to the input beam and in a plane parallel to the plane of the first crossed lenticular cylindrical lens means; and
   a focusing lens having a preselected focal length and interposed between the second crossed lenticular cylindrical lens means and a work plane at a separation from the work plane;
   the input beam refracting sequentially through the first and second crossed lenticular cylindrical lens means and the focusing lens onto the work plane;
   whereby the input beam is homogenized so as to produce an image in the work plane having a relatively uniform intensity profile characteristic.

2. The optical beam integration system of claim 1 wherein the first predetermined focal length and the second predetermined focal length equal a given focal length.

3. The optical beam integration system of claim 2 wherein the distance between the first crossed lenticular cylindrical lens means and the second crossed lenticular cylindrical lens means is in the range of zero to two times the given focal length.

4. The optical beam integration system of claim 3 wherein at least one of the first crossed lenticular cylindrical lens means and the second crossed lenticular cylindrical lens means is movably mounted so that the distance between the first and second crossed lenticular cylindrical lens means is selectively settable, and further comprising means connected to the movable crossed lenticular cylindrical lens means for enabling the distance between the first crossed lenticular cylindrical lens means and the second crossed lenticular cylindrical lens means to be adjusted, whereby the size of the image in the work plane is adjustable.

5. The optical beam integration system of claim 2 wherein at least one of the first crossed lenticular cylindrical lens means and the second crossed lenticular cylindrical lens means is movably mounted so that the distance between the first and second crossed lenticular cylindrical lens means is selectively settable, and further comprising means connected to the movable crossed lenticular cylindrical lens means for enabling the distance between the first crossed cylindrical lens means and the second crossed cylindrical lens means to be adjusted, whereby the size of the image in the work plane is adjustable.

6. The optical beam integration system of claim 2 wherein the first crossed lenticular cylindrical lens means comprises:
   at least a first cylindrical lens having the given focal length and having a longitudinal axis aligned in a plane substantially orthogonal to the input beam and a convex face oriented toward the source; and
   at least a second cylindrical lens having the given focal length and positioned proximate to the first cylindrical lens and on an opposite side of the first cyindrical lens from the source, the second cylindrical lens having a longitudinal axis aligned in a plane substantially orthogonal to the input beam and a convex face oriented toward the source, the longitudinal axis of the second cylindrical lens being oriented substantially perpendicular to the longitudinal axis of the first cylindrical lens; and
   wherein the second crossed lenticular cylindrical lens means comprises:
   at least a third cylindrical lens having the given focal length and positioned at a first spacing from the first cylindrical lens and on an opposite side of the second cylindrical lens from the source, the third cylindrical lens having a longitudinal axis aligned in a plane substantially orthogonal to the input beam and a convex face oriented away from the source, the longitudinal axis of the third cylindrical lens being parallel to the longitudinal axis of the first cylindrical lens; and
   at least a fourth cylindrical lens having the given focal length and positioned proximate to the third cylindrical lens and on an opposite side of the third cylindrical lens from the source, the fourth cylindrical lens being positioned at a second spacing from the second cylindrical lens, the fourth cylindrical lens having a longitudinal axis aligned in a plane substantially orthogonal to the input beam and a convex face oriented away from the source, the longitudinal axis of the fourth cylindrical lens being oriented substantially perpendicular to the longitudinal axis of the third cylindrical lens, the longitudinal axis of the fourth cylindrical lens being parallel to the longitudinal axis of the second cylindrical lens;
   the input beam refracting sequentially through the first, second, third, and fourth cylindrical lenses and the focusing lens onto the work plane.

7. The optical beam integration system of claim 6 wherein the first spacing between the first and third cylindrical lenses and the second spacing between the second and fourth cylindrical lenses, respectively, are in the range of zero to two times the given focal length.

8. The optical beam integration system of claim 6 wherein the first cylindrical lens and the second cylindrical lens are movably mounted so that the distance between the first and second cylindrical lenses with respect to the third and fourth cylindrical lenses is selectively settable, and further comprising means connected to the first cylindrical lens and the second cylindrical lens for enabling the distance between the second cylindrical lens and the third cylindrical lens to be adjusted, whereby the size of the image in the work plane is adjustable.

9. The optical beam integration system of claim 8 wherein at least one of the first and third cylindrical lenses, as well as at least one of the second and fourth cylindrical lenses, are movably mounted so that the first spacing, as well as the second spacing, are selectively settable, and further comprising means connected to each movable cylindrical lens for enabling the first spacing, as well as the second spacing, to be adjusted, whereby the aspect ratio of the image in the work plane is also adjustable.

10. The optical beam integration system of claim 6 wherein at least one of the first and third cylindrical lenses, as well as at least one of the second and fourth cylindrical lenses, are movably mounted so that the first spacing, as well as the second spacing, are selectively settable, and further comprising means connected to each movable cylindrical lens for enabling the first spacing, as well as the second spacing, to be adjusted, whereby the aspect ratio of the image in the work plane is adjustable.

11. The optical beam integration system of claim 6 wherein the separation between the focusing lens and the work plane equals the preselected focal length of the focusing lens.

12. The optical beam integration system of claim 1 wherein at least one of the first crossed lenticular cylindrical lens means and the second crossed lenticular cylindrical lens means is movably mounted so that the distance between the first and second crossed lenticular cylindrical lens means is selectively settable, and further comprising means connected to the movable crossed lenticular cylindrical lens means for enabling the distance between the first crossed lenticular cylindrical lens means and the second crossed lenticular cylindrical lens means to be adjusted, whereby the size of the image in the work plane is adjustable.

13. The optical beam integration system of claim 1 wherein the separation between the focusing lens and the work plane equals the preselected focal length of the focusing lens.

14. A method for optically integrating an input beam of radiant energy from a radiant energy source, the input beam having a nonuniform beam intensity profile characteristic, comprising the steps of:

refracting the input beam through a first crossed lenticular cylindrical lens means having a first predetermined focal length and aligned in a plane substantially orthogonal to the input beam, thereby producing a first intermediate beam;

refracting the first intermediate beam through a second crossed lenticular cylindrical lens means having a second predetermined focal length and positioned at a distance from the first crossed lenticular cylindrical lens means and on an opposite side of the first crossed lenticular cylindrical lens means from the source, the second crossed lenticular cylindrical lens means being aligned in a plane substantially orthogonal to the input beam and in a plane parallel to the plane of the first crossed lenticular cylindrical lens means, thereby producing a second intermediate beam; and refracting the second intermediate beam through a focusing lens having a preselected focal length and interposed between the second crossed lenticular cylindrical lens means and a work plane at a separation from the work plane, thereby producing a homogenized beam so as to produce an image in the work plane having a relatively uniform intensity profile characteristic.

15. The method of claim 14 wherein the first predetermined focal length and the second predetermined focal length equal a given focal length.

16. The method of claim 15 wherein the distance between the first crossed lenticular cylindrical lens means and the second crossed lenticular cylindrical lens means is the in the range of zero to two times the given focal length.

17. The method of claim 14, further comprising the step of adjusting the distance between the first crossed lenticular cylindrical means and the second crossed lenticular cylindrical lens means, thereby adjusting the size of the image in the work plane.

18. The method of claim 17, further comprising the step of adjusting a first spacing between a first cylindrical lens included in the first crossed lenticular cylindrical lens means and a third cylindrical lens included in the second crossed lenticular cylindrical lens means, as well as the step of adjusting a second spacing between a second cylindrical lens included in the first crossed lenticular cylindrical lens means and a fourth cylindrical lens included in the second crossed lenticular cylindrical lens means, thereby also adjusting the aspect ratio of the image in the work plane.

19. The method of claim 14, further comprising the step of adjusting a first spacing between a first cylindrical lens included in the first crossed lenticular cylindrical lens means and a third cylindrical lens included in the second crossed lenticular cylindrical lens means, as well as the step of adjusting a second spacing between a second cylindrical lens included in the first crossed lenticular cylindrical lens means and a fourth cylindrical lens included in the second crossed lenticular cylindrical lens means, thereby adjusting the aspect ratio of the image in the work plane.

20. The method of claim 14, wherein the separation between the focusing lens and the work plane equals the preselected focal length of the focusing lens.

* * * * *